United States Patent [19]

Menz

[11] Patent Number: 5,096,250
[45] Date of Patent: Mar. 17, 1992

[54] ROLL-AWAY CARGO BOX COVER

[76] Inventor: Joseph K. Menz, St. Gregor, Saskatchewan, Canada

[21] Appl. No.: 594,683

[22] Filed: Oct. 9, 1990

Related U.S. Application Data

[63] Continuation of Ser. No. 298,367, Jan. 18, 1989, abandoned.

[51] Int. Cl.$^5$ .............................................. B60P 7/04
[52] U.S. Cl. ............................... 296/98; 296/105; 160/271
[58] Field of Search ............... 298/367; 296/100, 105, 296/98, 32, 219; 160/266, 268.1, 270, 271, 309, 313

[56] References Cited

U.S. PATENT DOCUMENTS

| | | | |
|---|---|---|---|
| 1,903,240 | 3/1933 | Mayer | 296/105 |
| 2,406,737 | 9/1946 | Bramble | 296/105 |
| 2,496,437 | 2/1950 | Bramble | 296/105 |
| 2,594,910 | 4/1952 | Germann | 296/98 |
| 2,765,843 | 10/1956 | Nilles | 160/290 |
| 2,811,321 | 10/1957 | La Barre | 296/98 X |
| 2,976,082 | 3/1961 | Dahlman | 296/98 |
| 3,146,824 | 9/1964 | Veilleux | 296/98 X |
| 3,785,694 | 1/1974 | Sargent | 296/98 |
| 3,942,830 | 3/1976 | Woodard | 296/105 |
| 3,986,749 | 10/1976 | Hull et al. | 296/100 X |
| 4,273,377 | 6/1981 | Alexander | 296/219 X |
| 4,285,539 | 8/1981 | Cole | 296/105 |
| 4,547,014 | 10/1985 | Wicker | 296/100 |
| 4,563,034 | 1/1986 | Lamb | 296/98 |
| 4,786,099 | 11/1988 | Mount | 296/98 |
| 4,792,178 | 12/1988 | Kokx | 296/98 |
| 4,807,921 | 2/1989 | Champie et al. | 296/100 X |

FOREIGN PATENT DOCUMENTS

| | | |
|---|---|---|
| 475787 | 8/1951 | Canada . |
| 895191 | 3/1972 | Canada . |
| 952152 | 7/1974 | Canada . |
| 1030189 | 4/1978 | Canada . |
| 1077992 | 5/1980 | Canada . |
| 779772 | 4/1935 | France ........................... 296/98 |

*Primary Examiner*—Dennis H. Pedder
*Attorney, Agent, or Firm*—Irell & Manella

[57] ABSTRACT

A roll out tarp cover assembly is situated across the front end of a truck box and contains a roller upon which the tarpaulin or cover engages. It is operated by a retractable hand crank at one end. Transverse stiffeners are secured to the cover with the ends engaging side rails secured to the upper edges of the truck box sides and the cover may be detachably secured by the free end thereof to the upper edge of the tailgate by snap fasteners, magnets or the like. The side rails have drainage holes and a rain shedding outer shroud fasteners are slideably engageable within a track formed on the under side of the side rails in order to secure the rails to the upper edges of the truck box.

8 Claims, 4 Drawing Sheets

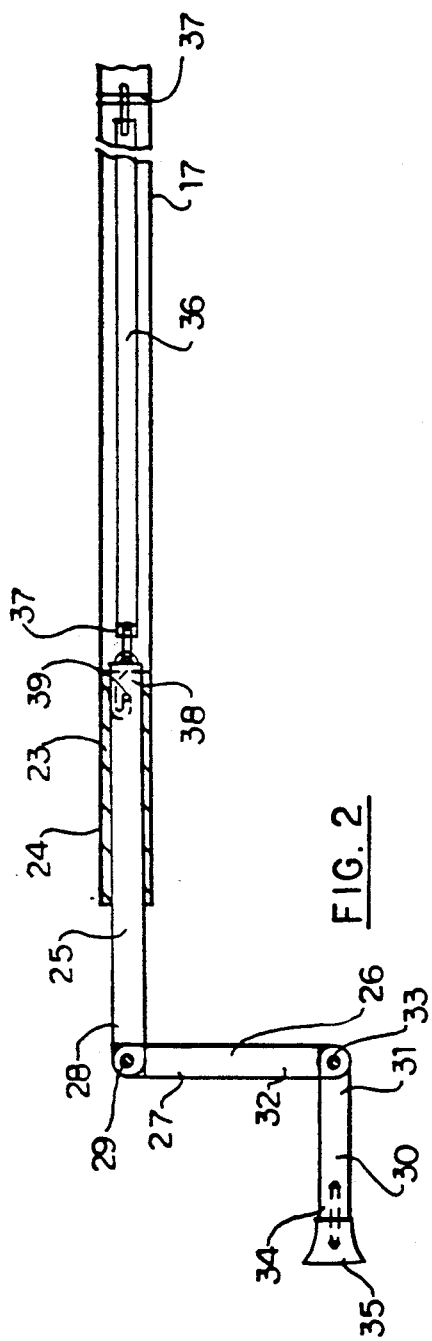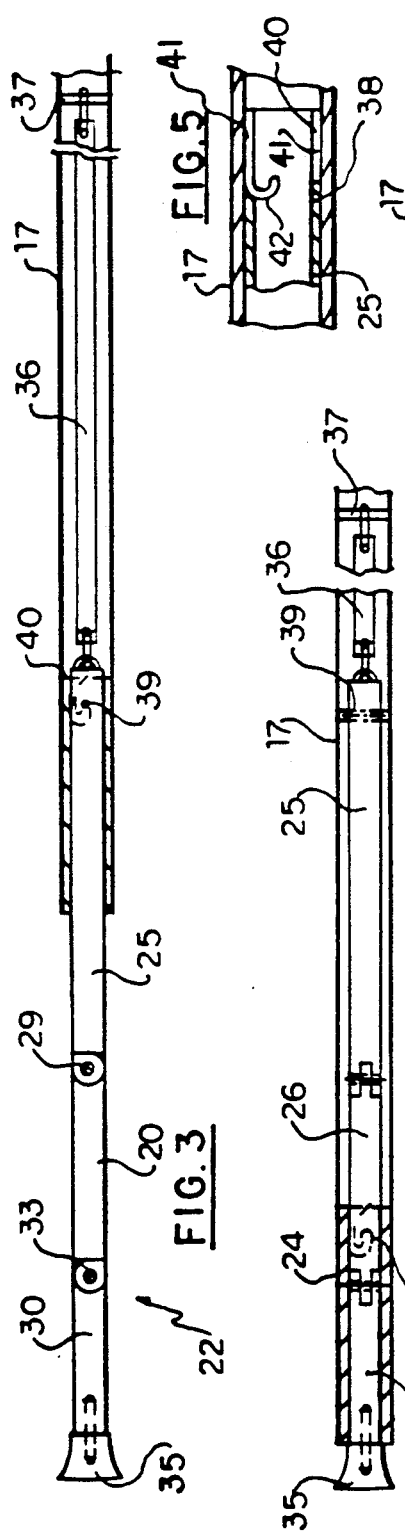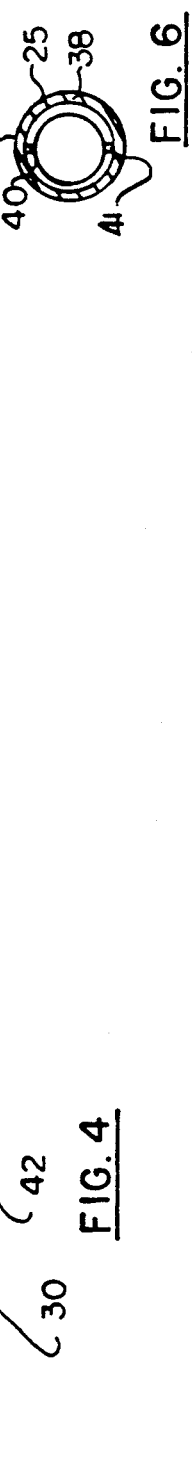

ROLL-AWAY CARGO BOX COVER

This application is a continuation of application Ser. No. 07/298,367, filed 1/18/89, now abandoned.

BACKGROUND OF THE INVENTION

This invention relates to new and useful improvements in retractable covers for open truck boxes, specifically relatively small truck boxes although it can be adapted for use in larger boxes if desired.

PRIOR ART

Prior references known to applicant include the following:

Canadian Patent 4,475,787 issued to Edwin C. Peterson.

This shows a canvas cover for trucks which is retractable and is provided with foldable guide members along the sides of the open body so that they can be folded out of the way when desired. It is designed specifically for use with grain trucks.

Canadian Patent 895,191 issued Mar. 14, 1972, Walter Michel.

This discloses a combination of three mounting frames to provide extended sides and rear to a truck box and includes a bar reinforced sheet deck relative to the upper opening. It includes a linkage supporting each end of a transverse cover-reinforcing bar with each link being freely pivotal about two vertically spaced pivot axis located in horizontal end portions of the linkage.

Canadian Patent 952,152 issued July 30, 1974, Charles E. Love.

This shows an electrically driven covering structure for extending a tarpaulin over a truck or trailer and includes a pair of track supporting frames mounted for vertical movement on opposite sides of the bed of the truck together with a pair of gear tracks mounted on the track supporting frames.

Canadian Patent 1,030,189 issued Apr. 25, 1978, Jacob Penner.

This shows a flexible cover carried on a spring loaded roller at one end of the track with the free end of the cover being secured to a pair of mounting plates supported for endwise rolling movement one upon each outer side wall of the truck body and operated by an endless chain engaging the plates and journalled over sprockets.

Canadian Patent 1,077,992 issued May 20, 1980, P. Muscillo.

This discloses a flexible cover which includes a plurality of guide engaging tracks on each side of the truck box and being gathered at one end when closed and pulled to an open position by the rear edge thereof and utilizing flexible cables for the guide means.

U.S. Pat. No. 2,765,843 issued Oct. 9, 1956, A. G. Nilles.

This shows an arrangement utilizing a spring loaded roller and having a flexible cover secured by one end thereof to the roller and being securable by the other end thereof to the rear of the truck. No guide means for the cover appear to be provided.

U.S. Pat. No. 2,976,082 issued Mar. 21, 1961, A. P. Dahlman.

This shows a roll up vehicle load cover which is anchored by one edge to one side of the truck body and to a roller situated on the other side of the body. A flexible cable is stitched to either end of the cover and runs over curved end walls of the truck as it is unrolled from the fixed end to the opened position.

U.S. Pat. No. 3,146,824 issued Sept. 1, 1964, R. L. Veilleux.

This discloses a pull out type flexible cover having a rear bar which engages hooks when in the fully opened position and then is secured by snaps. No side guide rails appear to be provided.

U.S. Pat. No. 3,986,749 issued Oct. 19, 1976, Hull et al.

This shows a concertina type tarpaulin mounted upon rollers running in side rails.

U.S. Pat. No. 4,285,539 issued Aug. 25, 1981, Richard C. Cole.

This shows a retractable tarp cover including a plurality of arched frames secured to the cover and which in turn are mounted upon rails so that the tarpaulin can be concertinered towards one end when closed.

In accordance with the present invention there is provided a roll away cover assembly for open truck boxes in which said truck boxes include a front end, spaced and parallel longitudinally extending sides and a tailgate or rear end portion; said cover assembly comprising in combination a roller assembly situated transversely across the front end of the associated truck box, a roller journalled for rotation within said roller assembly, said roller assembly including means to rotate said roller, a substantially rectangular flexible cover secured by one end thereof to said roller, at least two spaced and parallel stiffener members secured to and extending transversely across said cover, the ends of said stiffener members terminating spaced inwardly from the sides of said cover and stiffener guiding side rails secured one each to the upper edges of the sides of the associated truck box, the ends of said stiffener members and the longitudinal edges of said cover engaging within said side rails and being shielded thereby, and water drainage means in said side rails.

A further advantage of the invention is to provide relatively simple side rails which may be formed from extruded aluminum or the like and which are easily attached to the upper edges of the sides of the truck. The cover includes a plurality of transverse stiffeners to which the cover is secured as by adhesive and these stiffeners run within the tracks or side rails with the ends of the stiffeners and the longitudinal edges of the cover being shielded from the elements and the edges of the cover extending over drip rails in the side rails.

Another advantage is to provide a novel crank assembly which is easily stored within the roller carrying the cover across the front end of the truck and which can easily be moved to the operating position for winding up the cover when it is desired to open the upper side of the truck.

Still another advantage of the invention is to provide a device of the character herewithin described which is simple in construction, economical in manufacture and otherwise well suited to the purpose of which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 2 is a fragmentary cross-sectional view of the handle assembly and roller with the handle assembly shown in the operating position;

FIG. 3 is a view similar to FIG. 2 but showing the handle ready for retraction to the stored position;

FIG. 4 is similar to FIGS. 2 and 3 but showing the handle in the fully retracted or stored position;

FIG. 5 is a fragmentary cross-sectional view of the tubular end portion of the roller showing the locking means of the handle to the roller;

FIG. 6 is an end view of FIG. 5;

In the drawings like characters of reference indicate corresponding parts in the different figures.

DETAILED DESCRIPTION

Figure 1:
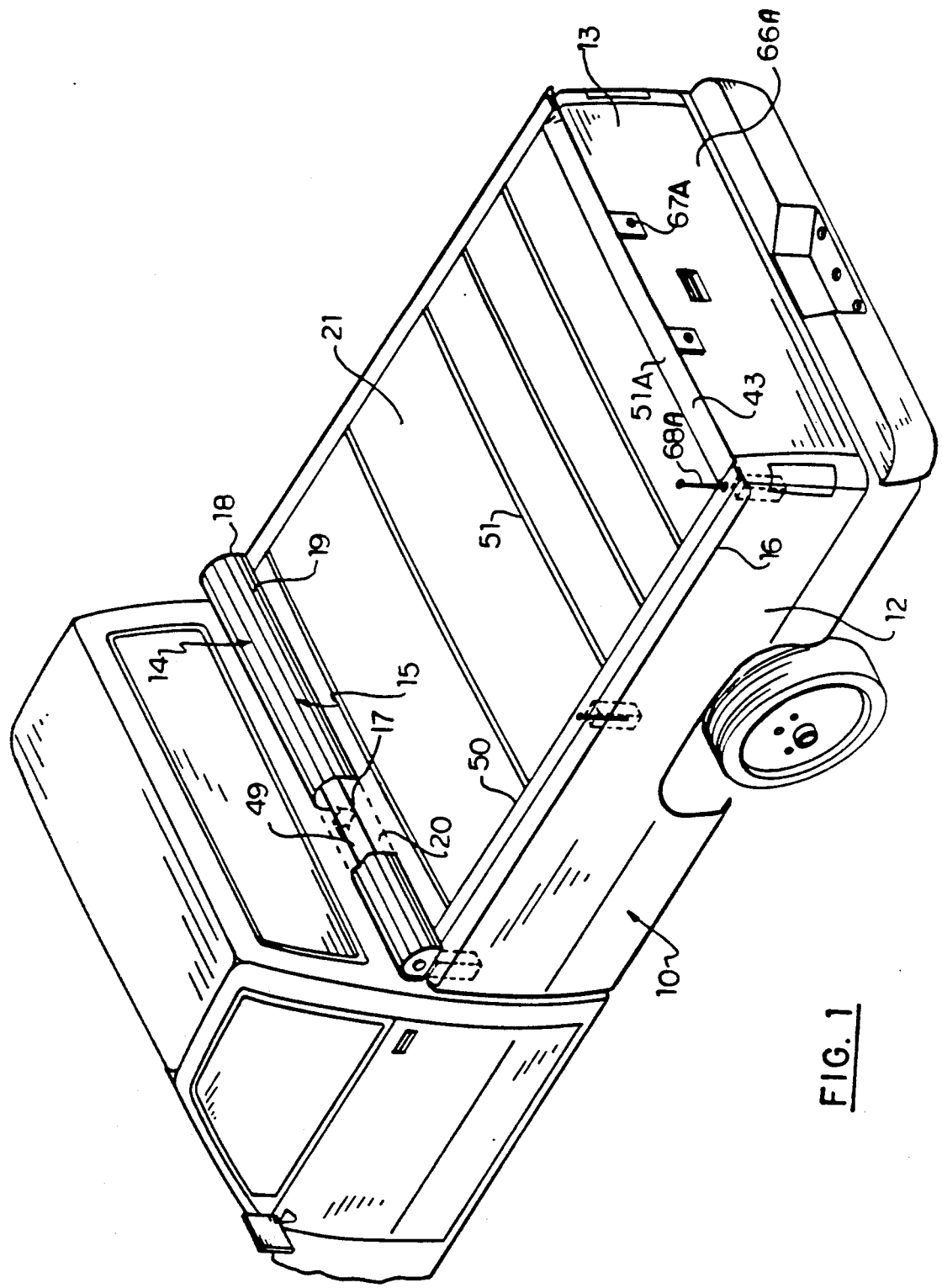
FIG. 1 is a fragmentary isometric view of part of a truck including an open body, with the invention shown in the closed or covered position.

Proceeding therefore to describe the invention in detail, reference should first be made to FIG. 1 which shows a truck body collectively designated 10 including a front end 11, two spaced and parallel longitudinally extending side panels 12 and an end panel in the form of a tailgate 13.

The invention collectively designated 14 includes a roller assembly collectively designated 15 secured across the upper edges 16 of the sides and adjacent the front 11 of the truck box.

It includes a cylindrical roller 17 journalled for rotation within bearings 18 in the end caps 18A of a shroud 19. The inner end 20 of a rectangular flexible cover panel 21, is attached to the roller 17 and the cover is rolled onto and from the roller.

Roller collars 17A are situated at each end of the roller 17 and engage within bearings 18 and the collar at the end with the crank 22 is radially apertured to co-act with a lock pin assembly 22A as will hereinafter be described (See FIG. 10).

A hand crank assembly collectively designated 22 is provided to rotate the cylindrical roller 17 to wind the flexible cover 21 towards the fully retracted or stored position.

This hand crank assembly is shown in FIGS. 2 through 6 which also shows one end portion of the roller 17.

A cylindrical bushing 23 is situated within the hollow tubular end portion 24 of the roller 17 and a cylindrical elongated portion 25 of the hand crank 22 slideably engages within this bushing for endwise movement.

A crank portion or link 26 is pivotally secured by one end 27 thereof to one end 28 of the elongated portion 25. Pivot pin 29 connects these two portions together.

A hand engaging portion 30 is pivotally secured by the inner end 31 thereof to the other end 32 of the crank portion or link 26 by means of pivot pin 33 and it will be noted that the outer end 34 of the hand engaging portion is enlarged by means of knob 35, the purpose of which will hereinafter be described A spring preferably taking the form of an elastomeric link 36 is connected by one end 37 thereof to the inner end 38 of the elongated portion 25 of the crank assembly and extends inwardly along the tubular portion 24 of the roller 17 to be anchored to a cross pin 37 spanning the tube as shown in FIG. 2. This elastomeric link or spring 36 normally retains the hand crank assembly in the fully retracted position shown in FIG. 4 with the enlarged knob 35 preventing complete engagement within the tubular portion 24 of the roller 17.

Reference to FIG. 3 will show that the pivotal connections 29 and 33 between the portions 25, 26 and 30 of the hand crank assembly permits same to be positioned as shown in FIG. 3 with all three portions being in longitudinal alignment so that the spring 36 may retract them to the position shown in FIG. 4.

However when it is desired to utilize the hand crank assembly in order to wind the canvas cover 21 onto the roller 17, the handle is pulled outwardly by the knob 35 until a handle engaging cross pin 39 situated adjacent the inner end 38 of the portion 25, engages the end 40 of the bushing 23. This bushing is provided with a pair of longitudinally extending slots 41 extending from the end 40 part way along the wall of the bushing and terminate in arcuately curved slot portions 42 as shown in FIG. 5. When the pin is pulled along the slots 40 and then the hand crank assembly is turned, the pin locks the portion 25 to the bushing and hence to the roller 17 so that rotation in a direction opposite to the curved tracks 42 will rotate the roller and retract the canvas cover 21 thereon.

When it is desired to retract the hand crank assembly, it is positioned as shown in FIG. 3 and then pulled outwardly slightly and turned to disengage the cross pin 39 from the slots 42 and 40 whereupon release of the handle will allow the spring 36 to retract it to the position shown in FIG. 4.

Figure 8:
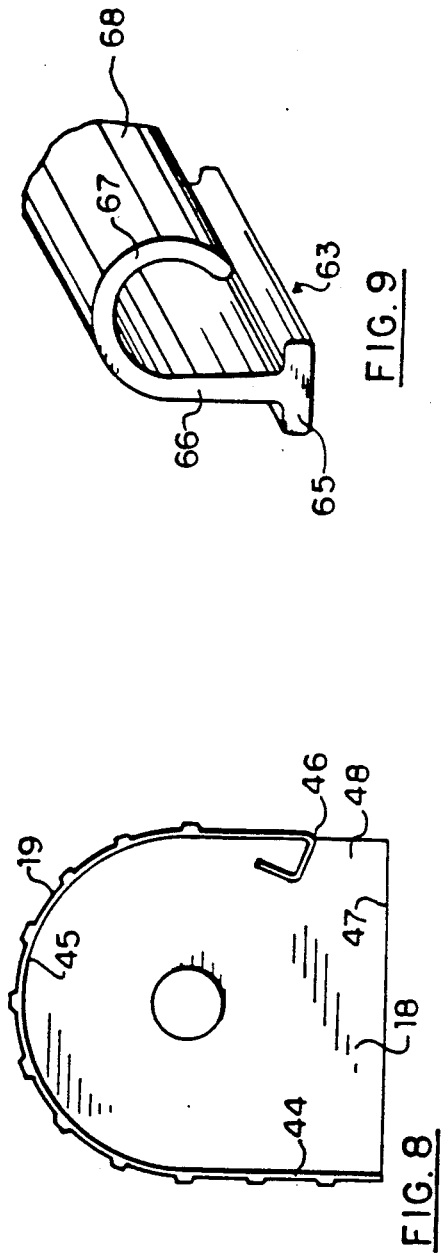
FIG. 8 is an end view of the cover or shroud for the roller assembly.

It should be understood of course that the canvas is extended by pulling on the rear end 43 thereof as will hereinafter be described. It should also be noted that the shroud 19 shown in FIG. 8, includes a front wall 44 and an overspanning curved portion 45 and terminates at a location indicated by reference character 46 spaced above the lower edges 47 of the end plates thus defining a transverse opening or slot therebetween indicated by reference character 48, through which the canvas extends and retracts. The end caps 18A engage within the ends of the shroud and are secured by screws to the end caps.

The canvas or cover 21 which is substantially rectangular in configuration includes a front edge 49 by which it is secured to the roller 17, the aforementioned rear edge 43, and a pair of spaced and parallel longitudinally extending side edges 50 and is dimensioned to completely cover the upper opening of the truck box when in the extended position.

This flexible cover is provided with a plurality of spaced and parallel, transversely situated stiffeners 51 secured as by adhesive or sewing to the cover panel 21 and in this embodiment, the stiffeners are on the underside of the cover when the cover is in the extended position shown in FIG. 1.

Figure 7:
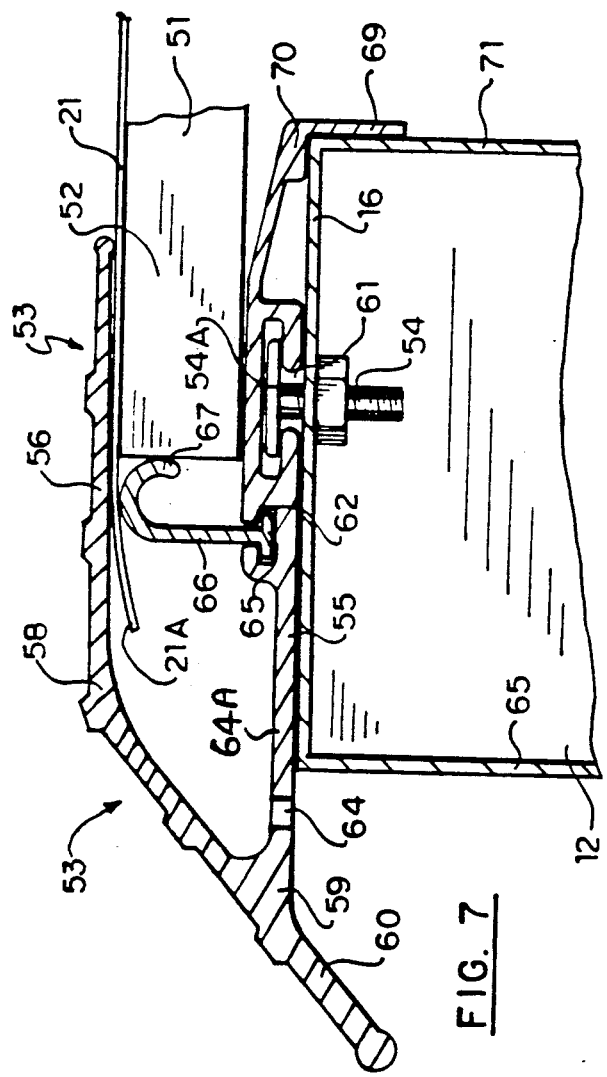
FIG. 7 is an enlarged end view of one of the side rails or tracks and showing one of the stiffeners engaged therewith.

The ends 52 of the stiffeners, which are preferably made of fiberglass, terminate spaced inwardly of the longitudinal edges 50 of the cover 21 and engage within longitudinally extending stiffener guiding tracks or side rails collectively designated 53 and shown in detail in FIG. 7. These side rails are secured to the upper edges 16 of the sides 12 of the truck as will hereinafter be described and include studs 54.

The side rails are preferably formed from extruded aluminum and include a longitudinally extending base 55, a spaced and parallel longitudinally extending upper side 56 and a downwardly and outwardly extending flange extending from the outer edge 58 of the upper side outwardly and downwardly to the outer edge 59 of the lower or base side and then extend to form a rain shedding portion 60 which extends beyond the outer surfaces of the sides 12 of the truck body.

A T-shaped track 61 is formed along the underside of the base 55 and is engaged by the flat heads 54A of a plurality of the studs 54 and may be positioned therealong as desired.

These studs 54 are moved along the T-shaped track 61 and engage through apertures drilled in the upper edges 16 of the truck body sides and secured thereto by washers and nuts as shown.

A further T-shaped track 62 is formed on the upper surface of the base 55 and a drip rail insert collectively designated 63 is engaged within this upper track and extends the full length of the side rails and acts as a locater for the extending end portions 52 of the stiffeners 51 as clearly shown in FIG. 7 as well as supporting the extending edges 21A of the cover 21.

Rain striking the cover 21 when in the extended position drains over the edges 21A and down into the area between the upper and lower portions 55 and 56 of the side rails outboard of the drip rail 63 and then drains through drain holes 64 formed in the base 55 adjacent the junction between the base and the flange portion 57.

Figure 9:
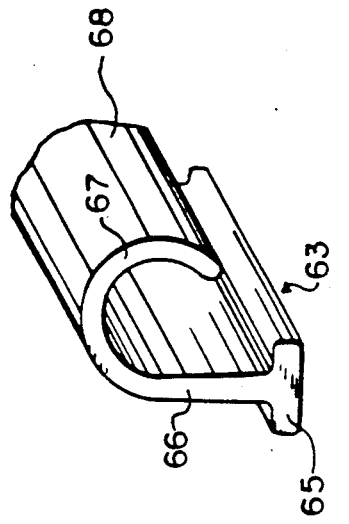
FIG. 9 is a fragmentary enlarged isometric view of the side rail insert per se.

The aforementioned insert 63 is shown in detail in FIG. 9 and includes a transverse base portion 65, a vertical portion 66 and a curved upper portion 67 presenting a curved surface 68 against which the ends 52 of the stiffeners may slideably engage with the upper side supporting the edge portions 21A of the cover 21. This drip rail may be integral with the side rail 53 but extrusion thereof is easier if it is separate. These curved surfaces restrict the sideways movement of the stiffeners and hence the cover 21.

A vertical flange 69 extends perpendicularly downwardly from the inner edge 70 of the base 55 of the side rails and engages over the upper edge of the inner surface 71 of the side 12 of the truck body as clearly shown with the drain holes 64 then being situated outboard of the outer surface 65 of the truck sides 12. This locates the rails correctly relative to the upper edges of the truck box sides and also protects the upper inner edges of the sides against damage.

The longitudinal channel defined along the base 55 between the track 62 and the outer edge 59 of the base 55 constitutes a water collecting trough 64A and the drain holes 64 are situated in this trough.

The rear stiffener specifically designated 51A is slightly wider than the remaining stiffeners and, when in the extended position, may be secured to the outer surface 66A of the tailgate either by snap fasteners 67A or magnets (not illustrated) or VELCRO (trademark) hook and loop fastener as desired. If it is desired, retaining pins 68A may engage through the rear ends of the side rails 53 and into the upper edge of the sides 12 as shown in FIG. 1.

Figure 11:
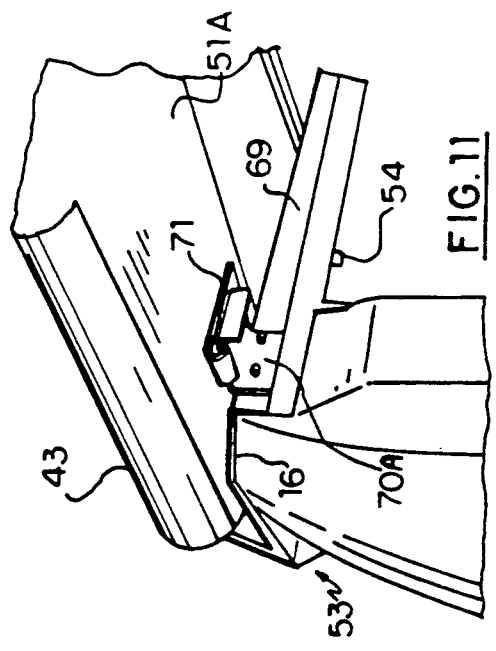
FIG. 11 is a fragmentary isometric view of the inside rear of the truck body showing the preferred embodiment of the retainer clips.

However the preferred embodiment utilizes cover clips shown in FIG. 11. These include hook clip portions 70a secured one each side to the inside of the upper edges of the sides of the truck body through the flange 69 of the side rails and adjacent the rear ends thereof. Similar hook clip portions 71 are secured to the underside of the cover 21 spaced just inwardly of the free end 43 and are situated at right angles to the clip portions 70. When extended, the hook of the clip portion 71 engage the rear sides of the Clip portions 70A and are prevented from slipping off of the clips 70A by means of the hook portions thereof as shown.

Figure 12:
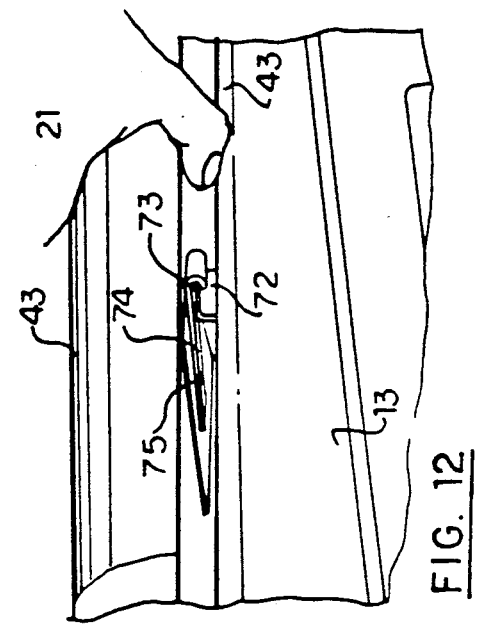
FIG. 12 is a fragmentary isometric view of the rear of the tail gate showing the preferred security latch assembly of the cover to the tail gate.

FIG. 12 shows the preferred embodiment of the security latch assembly which includes an angulated clip 72 secured to the inside of the upper edge 43 of the tail gate 13 and centrally thereof with the angulated portion 73 extending rearwardly. A hook clip 74 is secured to the underside of the cover 21 and centrally thereof spaced just inboard of the rear edge 43 of the cover. This hook portion 74 is secured by a single bolt 75 and when in the position shown in FIG. 12, it hooks over the angulated portion 73 of the clip 72 as shown. Once engaged, the hand crank 22 is rotated slightly to tension the cover whereupon the lock pin assembly 22 is actuated to lock the roller in this tensioned position.

Figure 10:
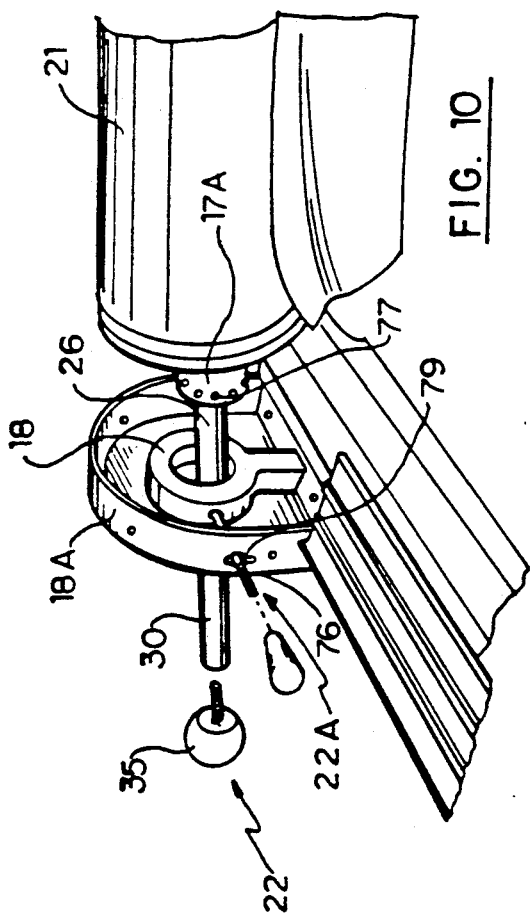
FIG. 10 is a fragmentary isometric view of the front end of the assembly with the roller spaced from the end cap for clarity.

This lock pin assembly shown in FIG. 10 consists of a spring loaded pin 76 engaging through the end cap 18A, through an aperture within the ring bearing 18 and into the closest adjacent aperture 77 in the collar 17A of the roller.

The lock pin 22A includes a cross pin which passes through a slot 79 in the end cap so that when it is turned through 90°, the lock pin is held in the disengaged position against pressure of the spring (not illustrated) which of course will reseat the lock pin within one of the apertures 77 when the pin is rotated a further 90° so that the lock pin lines up with the slot.

In operation, reference to FIG. 1 will show the cover in the fully extended position. When it is desired to retract same, the retaining means 67A or 70A/71 are disconnected and the crank handle extended as illustrated in FIG. 2 and the lock pin 22A is pulled out of engagement and turned 90°. Rotation of this crank handle will wind the drum thus winding the cover 21 together with the stiffeners 51, onto the roller through the transverse opening 48 in the shroud 19. When the cover is in the fully retracted position the crank is straightened out and stored in the position shown in FIG. 4. Once in the stored position, the lock pin 22 may be actuated to prevent inadvertent rotation of the roller assembly. It will be appreciated that before extending the cover, this lock pin assembly must be moved to the disengaged position as hereinbefore described.

Extension is by grasping the rear end 43 of the cover and pulling it outwardly along the side rails 53 and securing the fastening means 67A or 70A/71 with the cover then being in the fully extended position shown in FIG. 1. It should be noted that the cover should be pulled from the center of the rear edge thereof in order to prevent binding within the side rails.

Finally it should be noted that the single pin 75 holding the security latch hook component 74 enables this hook component to be swiveled sideways so that it will not engage the security latch. This is sometimes desirable when it is preferred that the tail gate can either be opened or left open for easy access to the material adjacent the rear of the truck body under which circumstances the side rail clips shown in FIG. 11 are relied upon to maintain the cove in the extended position.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A roll away cover assembly for an open truck box including a front end, spaced and parallel longitudinally extending side walls and a rear end, each side wall having a horizontal upper surface; said cover assembly comprising a roller assembly for mounting transversely across the truck box at one end thereof and including a roller, means mounting the roller for rotation about a horizontal axis at said one end and means to rotate said roller about said axis, a substantially rectangular flexible cover having a first and a second end and spaced parallel longitudinally extending side edges, means securing said first end to said roller, a plurality of spaced and parallel stiffener members secured to and extending transversely across said cover and having ends of each said stiffener members terminating at a position spaced inwardly from a respective one of said side edges of said cover, and two side guide rails each for attachment to an upper surface of a respective one of the side walls of the truck box for receiving and guiding a respective one of the side edges of said cover, each side guide rail comprising a channel member with an open slot thereof facing inwardly toward the cover and defined by a lower wall for resting upon and attachment to the upper surface of a side wall of the box, an upper wall spaced from the lower wall to define said inwardly facing slot and a connecting wall portion at an outward end of each of the upper and lower walls interconnecting the upper and lower walls and supporting the upper wall, said lower wall having a drip rail member therein so as to extend continuously longitudinally of the lower wall and projecting upwardly from the lower wall toward the upper wall at a position spaced outwardly of said open slot and inwardly of said connecting portion and defining between said connecting portion and said drip rail member a moisture receiving chamber, said side edge of said cover being received over an upper edge of the drip rail member into said moisture receiving chamber, said side edge of the cover being shaped relative to the moisture receiving chamber such that it is a loose fit therein such that moisture on an upper surface of the cover is deposited into the moisture receiving chamber, and a plurality of openings in the channel member at spaced positions along the length of the channel member communicating between the moisture receiving chamber and a position on the channel member exteriorly of said side wall of the truck box for releasing said moisture to the exterior of the truck box.

2. The cover box assembly according to claim 1 wherein the lower wall includes an outer portion thereof for extending beyond an outer edge of the upper surface of the side wall and wherein the openings extend through said outer portion of the lower wall.

3. The cover assembly according to claim 2 wherein said connecting wall portion includes a flange portion extending outwardly and downwardly from an outer edge of the outer portion of the lower wall.

4. The cover assembly according to claim 1 wherein said roller comprises a hollow tubular member, said means to rotate said roller comprising a hand crank assembly having an elongate operating portion slideably engageable within said hollow tubular member, a crank portion pivotally secured by one end thereof to an outer end of said elongate operating portion and a handle portion pivotally secured by one end thereof to an opposed end of said crank portion, said portions being movable from a cranking position in which the crank portion is at right angles to the operating portion and the handle portion is parallel to the operating portion to a storage position in which said operating portion, said crank portion and said handle portion lie in a common straight line and in which said portions are shaped so as to be slideably received within said hollow tubular member for storage purposes, spring means extending between an opposed end of said elongate operating portion and said hollow tubular member normally urging said operating portion, said crank portion and said handle portion into the stored position and means to detachably engage said operating portion with said hollow tubular member when in the said cranking position for driving rotation of said tubular member by cranking of said operating portion.

5. The cover assembly according to claim 4 in which said means to detachably engage said elongate operation portion within said hollow tubular member includes a projecting pin adjacent the said opposed end of said elongate operating portion selectively engageable with a slot in the inner surface of said hollow tubular member when said hand crank is in the cranking position, to lock said elongate operating portion to said roller.

6. The cover assembly according to claim 1 in which said drip rail member includes an upwardly extending substantially vertical portion, a convexly curved upper surface and a downwardly curved convexly curved inner portion, the ends of said stiffener members being engageable against said inner portion of said drip rail member.

7. The cover assembly according to claim 1 in which said drip rail member is formed separately from said side guide rail and includes an inverted T-shaped base, a T-shaped slot formed along the upper surface of said lower wall of said side guide rail, said inverted T-shaped base slideably engaging said T-shaped slot formed along the upper surface of said lower wall.

8. A roll away cover assembly, for an open truck box including a front end, spaced and parallel longitudinally extending side walls and a rear end, each side wall having a horizontal upper surface; said cover assembly comprising a roller assembly for mounting transversely across the truck box at one end thereof and including a roller, means mounting the roller for rotation about a horizontal axis at said one end and means to rotate said roller about said axis, a substantially rectangular flexible cover having a first and second end and spaced parallel longitudinally extending side edges, means securing said first end to said roller, a plurality of spaced and parallel stiffener members secured to and extending transversely across said cover, and two side guide rails each for attachment to an upper surface of a respective one of the side walls of the truck box for receiving and guiding a respective one of the side edges of said cover, each side guide rail comprising a channel member with an open slot thereof facing inwardly toward the cover and defined by a substantially horizontal lower wall for resting upon and attachment to the upper surface of a side wall of the box, a substantially horizontal upper wall spaced from the lower wall to define said inwardly facing slot and an inclined connecting wall portion at an outward end of each of the upper and lower walls interconnecting the upper and lower walls and supporting the upper wall, said connecting wall portion including a first portion extending upwardly and inwardly from an outermost edge of the lower wall to an outermost edge of the upper wall and a flange portion extending as a contiguous extension of said first portion outwardly and downwardly beyond the outermost edge of the lower wall so as to project outwardly of an outer edge of the horizontal upper surface of the side wall to provide protection for the side wall.

* * * * *